United States Patent
Zsigmond et al.

(10) Patent No.: US 12,335,826 B2
(45) Date of Patent: Jun. 17, 2025

(54) HANDLING OF SERVICES AFTER MC USER MIGRATION

(71) Applicant: NOKIA SOLUTIONS AND NETWORKS OY, Espoo (FI)

(72) Inventors: Gábor Zsigmond, Budapest (HU); Szabolcs Zabo, Budapest (HU)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 284 days.

(21) Appl. No.: 17/793,175

(22) PCT Filed: Jan. 16, 2020

(86) PCT No.: PCT/FI2020/050025
§ 371 (c)(1),
(2) Date: Jul. 15, 2022

(87) PCT Pub. No.: WO2021/144496
PCT Pub. Date: Jul. 22, 2021

(65) Prior Publication Data
US 2023/0345218 A1    Oct. 26, 2023

(51) Int. Cl.
*H04W 4/10* (2009.01)
*H04W 4/50* (2018.01)
*H04W 8/18* (2009.01)

(52) U.S. Cl.
CPC .............. *H04W 4/50* (2018.02); *H04W 4/10* (2013.01); *H04W 8/18* (2013.01)

(58) Field of Classification Search
CPC ............ H04W 4/50; H04W 4/10; H04W 8/18
USPC ....................................................... 455/418
See application file for complete search history.

(56) References Cited

U.S. PATENT DOCUMENTS

| 2010/0325313 | A1* | 12/2010 | Esteve Asensio | .... H04L 67/306 709/246 |
| 2014/0094159 | A1* | 4/2014 | Raleigh | ................. H04W 24/02 455/418 |

FOREIGN PATENT DOCUMENTS

CN            107465546 A      12/2017

OTHER PUBLICATIONS

"3rd Generation Partnership Project; Technical Specification Group Core Network and Terminals; Mission Critical Push to Talk (MCPTT) call control; Protocol specification (Release 16)", 3GPP TS 24.379 v16.3.0, (Dec. 2019), 603 pages.

"3rd Generation Partnership Project; Technical Specification Group Services and System Aspects; Common Functional Architecture to Support Mission Critical Services; Stage 2 (Release 15)", 3GPP TS 23.280 v15.5.0, (Dec. 2018), 203 pages.

(Continued)

*Primary Examiner* — Ted M Wang
(74) *Attorney, Agent, or Firm* — ALSTON & BIRD LLP

(57) ABSTRACT

There is disclosed an apparatus comprising at least one processing circuitry, and at least one memory for storing instructions to be executed by the processing circuitry. The at least one memory and the instructions are configured to, with the at least one processing circuitry, cause the apparatus at least to configure a set of substitute functions. The apparatus is further caused to request a service user profile associated with a migration request. Still further, the apparatus is caused to create, based on the requested service user profile, a modified service user profile comprising the set of substitute functions, and to provide the modified service user profile.

22 Claims, 7 Drawing Sheets

(56) References Cited

OTHER PUBLICATIONS

"3rd Generation Partnership Project; Technical Specification Group Services and System Aspects; Functional architecture and information flows to support Mission Critical Push to Talk (MCPTT); Stage 2 (Release 17)", 3GPP TS 23.379 v17.1.0, (Dec. 2019), 239 pages.
"3rd Generation Partnership Project; Technical Specification Group Services and System Aspects; Mission Critical Push to Talk (MCPTT); Stage 1 (Release 17)", 3GPP TS 22.179 v17.0.0, (Dec. 2019), 88 pages.
"3rd Generation Partnership Project; Technical Specification Group Services and System Aspects; Mission Critical Services Common Requirements (MCCoRe); Stage 1 (Release 17)", 3GPP TS 22.280 v17.2.0, (Dec. 2019), 97 pages.
"3rd Generation Partnership Project; Technical Specification Group Services and System Aspects; Study on Migration and Interconnection for Mission Critical Services (Release 15)", 3GPP TR 23.781 v1.2.0, (May 2017), 67 pages.
International Search Report and Written Opinion for Patent Cooperation Treaty Application No. PCT/FI2020/050025 dated Apr. 23, 2020, 14 pages.
Nokia, "User Profile Configuration Management Procedures to Support Functional Alias(es)", 3GPP TSG-SA WG6 Meeting #18, S6-170886, (Jul. 17-21, 2017), 6 pages.
Office Action for European Application No. 20913805.6 dated Mar. 28, 2024, 14 pages.
"3rd Generation Partnership Project; Technical Specification Group Services and System Aspects; Common functional architecture to support mission critical services; Stage 2 (Release 17)", 3GPP TS 23.280 v17.1.0, (Dec. 2019).
"3rd Generation Partnership Project; Technical Specification Group Services and System Aspects; Study on migration and interconnection for mission critical services (Release 15)", 3GPP TR 23.781 v15.0.0, (Jun. 2017), 66 pages.
Extended European Search Report for European Application No. 20913805.6 dated Jul. 12, 2023, 12 pages.
Intention to Grant for European Application No. 20913805.6 dated Sep. 18, 2024, 41 pages.
Extended European Search Report for European Application No. 24209178.3 dated Jan. 23, 2025, 5 pages.

* cited by examiner

HANDLING OF SERVICES AFTER MC USER MIGRATION

CROSS-REFERENCE TO RELATED APPLICATIONS

This application is a national phase entry of International Application No. PCT/FI2020/050025, filed Jan. 16, 2020, the contents of which are hereby incorporated by reference in their entirety.

FIELD

The present disclosure relates to handling of services after Mission Critical (MC) user migration.

Examples of embodiments relate to apparatuses, methods and computer program products relating to handling of services after MC user migration.

BACKGROUND

A functional alias is a user selectable alias that is tied to the assignment or task of the user. A MCX User (MCX collectively for Mission Critical Push To Talk (MCPTT), MCVideo and MCData services) can activate one or multiple functional aliases at the same time. The activation of the functional alias(es) will take place after the user has signed in to a MCX Service using a MCX User ID.

Usually one MCPTT system can be a public safety organization (or transport organization) of a certain country. A MC user from this system can migrate to another national MCPTT system, e.g. in case of an accident, policemen or firemen can migrate to the disaster relief MCPTT system. Additionally, the MC user can migrate to another country's MCPTT system, e.g. in case of a train driver of an international train going to the neighboring country.

It may happen that the role of the migrated MC user is not the same in the partner/participating MCPTT system, e.g. if a new role is assigned in the disaster relief network, the train number is changed in the other country, or just the domain part of the functional alias will be different.

In this case the MC user shall register for a new functional alias in the participant MCPTT system after the migration, in order to be able to be reached by local MC users.

When a MC user moves into the partner MCPTT system (herein below referred to as partner MC system) service area and the user profile is migrated to the partner MC system, then all the functional aliases are also migrated to the partner MC system.

However, there is a problem that parameters contained by the migrated MC user profile refer to the primary MC system (from which the MC user is migrated) only, thus making usage of services for the MC user in the partner MC system problematic/difficult.

REFERENCES

3GPP 23.280 V 15.5.0 Release 15—LTE; Common functional architecture to support mission critical services The following meanings for the abbreviations used in this specification apply:

2G Second Generation
3G Third Generation
3GPP 3$^{rd}$ Generation Partnership Project
3GPP2 3$^{rd}$ Generation Partnership Project 2
4G Fourth Generation
5G Fifth Generation
AP Access Point
BS Base Station
DetNet Deterministic Networking
DSL Digital Subscriber Line
EDGE Enhanced Data Rates for Global Evolution
eNB Evolved Node B
ETH Ethernet
ETSI European Telecommunications Standards Institute
GPRS General Packet Radio System
gNB gNodeB
GSM Global System for Mobile communications
IEEE Institute of Electrical and Electronics Engineers
IETF Internet Engineering Task Force
ISDN Integrated Services Digital Network
ITU International Telecommunication Union
LTE Long Term Evolution
LTE-A Long Term Evolution-Advanced
MANETs Mobile Ad-Hoc Networks
MC Mission Critical
MCPTT Mission Critical Push To Talk
NB NodeB
PCS Personal Communications Services
TISPAN Telecoms & Internet converged Services & Protocols for Advanced Networks
UE User Equipment
UMTS Universal Mobile Telecommunications System
UWB Ultra-Wideband
WCDMA Wideband Code Division Multiple Access
WiMAX Worldwide Interoperability for Microwave Access
WLAN Wireless Local Area Network

SUMMARY

Various exemplary embodiments of the present disclosure aim at addressing at least part of the above issues and/or problems and drawbacks.

Various aspects of exemplary embodiments of the present disclosure are set out in the appended claims.

According to an example of an embodiment, there is provided, for example, an apparatus comprising at least one processing circuitry, and at least one memory for storing instructions to be executed by the processing circuitry. The at least one memory and the instructions are configured to, with the at least one processing circuitry, cause the apparatus at least to configure a set of substitute functions. The apparatus is further caused to request a service user profile associated with a migration request. Still further, the apparatus is caused to create, based on the requested service user profile, a modified service user profile comprising the set of substitute functions, and to provide the modified service user profile.

In addition, according to an example of an embodiment, there is provided, for example, a method comprising the steps of configuring a set of substitute functions, and requesting a service user profile associated with a migration request. The method further comprises the steps of creating, based on the requested service user profile, a modified service user profile comprising the set of substitute functions, and providing the modified service user profile.

According to further refinements, these examples may include one or more of the following features:

Optionally, the at least one memory and the instructions are configured to, with the at least one processing circuitry, further cause the apparatus at least to create the modified service user profile by adding the set of substitute functions to the requested service user profile;

Alternatively, the at least one memory and the instructions may be configured to, with the at least one processing circuitry, further cause the apparatus at least, to configure an artificial service user profile comprising the set of substitute functions, to assess whether a terminal endpoint device associated with the migration request has the artificial service user profile configured, and, if the terminal endpoint device has the artificial service user profile configured, to create the modified service user profile by adding the set of substitute functions from the artificial service user profile to the requested service user profile;

Furthermore, the at least one memory and the instructions may be configured to, with the at least one processing circuitry, further cause the apparatus at least to configure the set of substitute functions being associated with a network system to allow for using services in the associated network system based on the set of substitute functions;

Moreover, the at least one memory and the instructions are configured to, with the at least one processing circuitry, further cause the apparatus at least to configure a plurality of sets of substitute functions, wherein each set of substitute functions out of the plurality of sets of substitute functions is associated with a different network system out of a plurality of network systems. Further, the apparatus is caused to create the modified service user profile to comprise one set of substitute functions out of the plurality of sets of substitute functions, based on the migration request.

Furthermore, according to an example of an embodiment, there is provided, for example, an apparatus comprising at least one processing circuitry, and at least one memory for storing instructions to be executed by the processing circuitry. The at least one memory and the instructions are configured to, with the at least one processing circuitry, cause the apparatus at least, to provide a requested service user profile for a migration process.

Additionally, according to an example of an embodiment, there is provided, for example, a method comprising the steps of providing a requested service user profile for a migration process.

Furthermore, according to an example of an embodiment, there is provided, for example, an apparatus comprising at least one processing circuitry, and at least one memory for storing instructions to be executed by the processing circuitry. The at least one memory and the instructions are configured to, with the at least one processing circuitry, cause the apparatus at least, to request a service user profile to be used by the apparatus after migration of the apparatus. Further, the apparatus is caused to obtain the service user profile comprising a set of substitute functions, and to activate the set of substitute functions.

Additionally, according to an example of an embodiment, there is provided, for example, a method comprising the steps of requesting a service user profile to be used after a migration process, obtaining the service user profile comprising a set of substitute functions, and activating the set of substitute functions.

According to further refinements, these examples may include one or more of the following features:

Optionally, the at least one memory and the instructions are configured to, with the at least one processing circuitry, further cause the apparatus at least, if the apparatus has an artificial service user profile configured, to obtain the service user profile comprising the set of substitute functions from the artificial service user profile;

Moreover, the at least one memory and the instructions may be configured to, with the at least one processing circuitry, further cause the apparatus at least to use services provided in a network system into which the apparatus migrated, based on the activated set of substitute functions.

In addition, according to embodiments, there is provided, for example, a computer program product for a computer, including software code portions for performing the steps of the above defined methods, when said product is run on the computer. The computer program product may include a computer-readable medium on which said software code portions are stored. Furthermore, the computer program product may be directly loadable into the internal memory of the computer and/or transmittable via a network by means of at least one of upload, download and push procedures.

Any one of the above aspects enables to handle services after MC user migration to thereby solving at least part of the problems and drawbacks identified in relation to the prior art.

Thus, improvement is achieved by apparatuses, methods, and computer program products enabling to handle services after MC user migration.

BRIEF DESCRIPTION OF THE DRAWINGS

Some embodiments of the present disclosure are described below, by way of example only, with reference to the accompanying drawings, in which.

DESCRIPTION OF EMBODIMENTS

Figure 1:
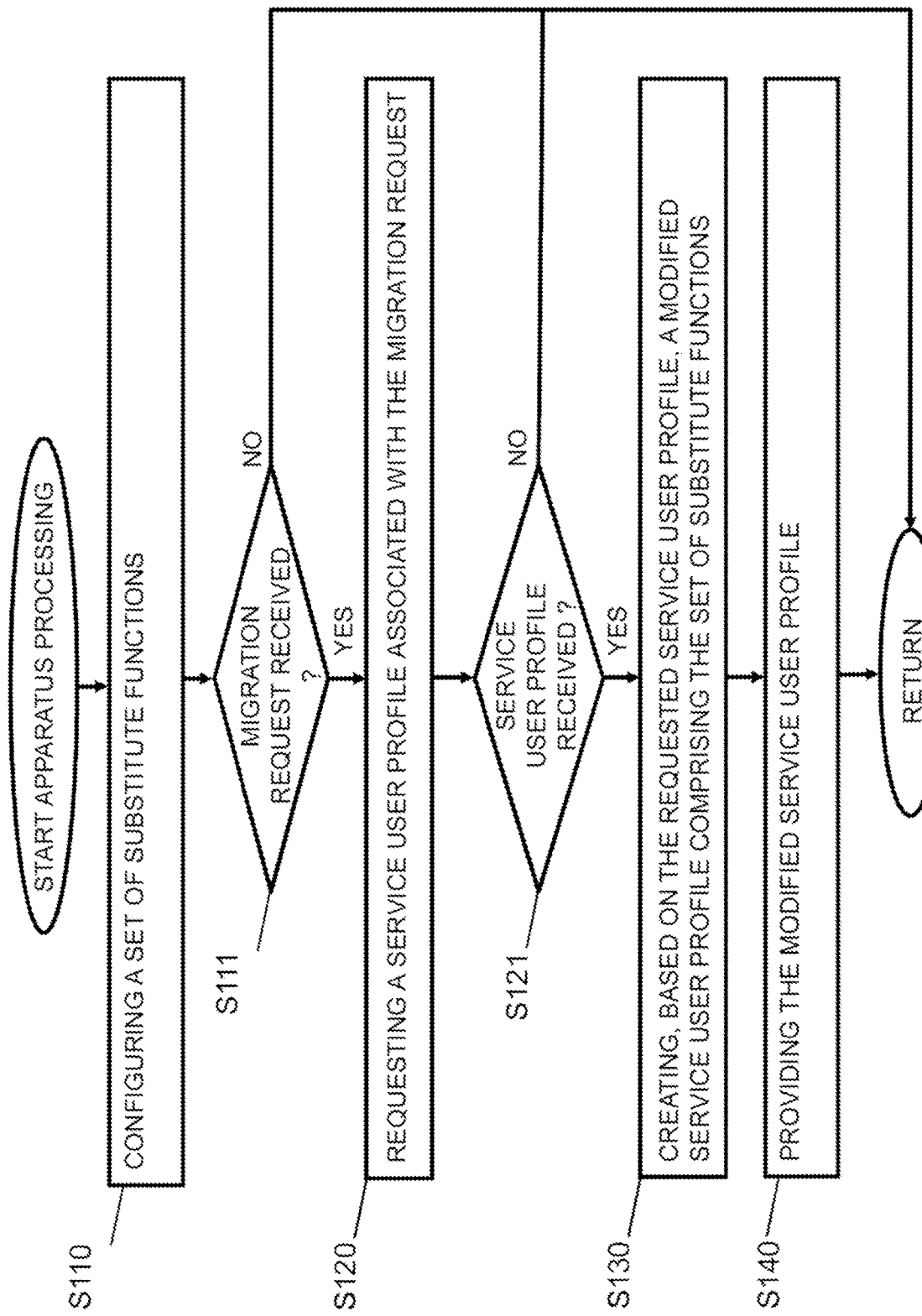
FIG. 1 shows a flow chart illustrating steps corresponding to a method according to examples of embodiments.

In the last years, an increasing extension of communication networks, e.g. of wire based communication networks, such as the Integrated Services Digital Network (ISDN), Digital Subscriber Line (DSL), or wireless communication networks, such as the cdma2000 (code division multiple access) system, cellular $3^{rd}$ generation (3G) like the Universal Mobile Telecommunications System (UMTS), fourth generation (4G) communication networks or enhanced communication networks based e.g. on Long Term Evolution (LTE) or Long Term Evolution-Advanced (LTE-A), fifth generation (5G) communication networks, cellular 2nd generation (2G) communication networks like the Global System for Mobile communications (GSM), the General Packet Radio System (GPRS), the Enhanced Data Rates for Global Evolution (EDGE), or other wireless communication system, such as the Wireless Local Area Network (WLAN), Bluetooth or Worldwide Interoperability for Microwave Access (WiMAX), took place all over the world. Various organizations, such as the European Telecommunications Standards Institute (ETSI), the $3^{rd}$ Generation Partnership Project (3GPP), Telecoms & Internet converged Services & Protocols for Advanced Networks (TISPAN), the International Telecommunication Union (ITU), $3^{rd}$ Generation Partnership Project 2 (3GPP2), Internet Engineering Task Force (IETF), the IEEE (Institute of Electrical and Electronics Engineers), the WiMAX Forum and the like are working on standards or specifications for telecommunication network and access environments.

Basically, for properly establishing and handling a communication between two or more end points (e.g. communication stations or elements or functions, such as terminal devices, user equipments (UEs), or other communication network elements, a database, a server, host etc.), one or more network elements or functions (e.g. virtualized network functions), such as communication network control elements or functions, for example access network elements like access points, radio base stations, relay stations, eNBs, gNBs etc., and core network elements or functions, for example control nodes, support nodes, service nodes, gateways, user plane functions, access and mobility functions etc., may be involved, which may belong to one communication network system or different communication network systems.

In view of different communication network systems, it is herein below referred to a first network system, which e.g. refers to a primary MC system, and a second network system, which e.g. refers to a partner MC system. Specifically, referring to handling services after MC user migration, when a MC user moves into a partner MC system service area (from a primary MC system service area) and the user profile is migrated to the partner MC system, then all the functional aliases are also migrated to the partner MC system. The MC user profile contains, among many other elements, the following: Authorization to create and delete aliases of an MC User and its associated user profiles, alphanumeric aliases of a user, authorization to request association between active functional alias(es) and MCPTT ID(s), and a list of functional alias(es) of the MC user.

These parameters control whether the migrated MC user is allowed or not to activate functional aliases, and which functional aliases are connected to the user. The problem is, however, that these parameters refer only to the primary MC system, which is the system from which the user is migrated. If the MC user is migrated to a partner MC system, then there are no parameters, which control the functional alias usage in the partner MC system.

With the migrated MC user profile, the MC user is not able to activate any functional alias in the partner MC system, as usually the functional alias structure or domain are different in the partner MC system in comparison to the primary MC system. Thus, the MC user is able to activate and deactivate the functional aliases from the primary MC system only. Functional alias structure can e.g. be "role@domain"; a domain can be the name of an organization or the company and can e.g. even contain reference for the country, like e.g. "captain1@coastguard.usa" or "captain01@coastguard.ca".

Thus, although a UE can communicate with another UE in a partner MC system without the functional aliases being activated, there are several disadvantages. Activation of functional aliases is needed for another UE to reach the migrated MC user based on the migrated MC user's functional role. In this context, it is to be considered that without functional aliases being activated other users can reach the migrated user only with MCPTT ID, which is, however, usually unknown when the user migrated from another system and local users don't know who is migrated and the time of migration. Further, activated functional aliases are shown on different UEs as Calling line identification.

Current 3GPP standards describe the MC user profile migration and the functional alias activation only. However, no standard specifies the functional alias activation after migration for the migrated MC user in the partner MC system. Thus, the current specification of the standards does not allow for the migrated MC user to use/activate local functional aliases in the partner MC system. Accordingly, the migrated MC user cannot be called by other MC users in the partner MC system with local functional aliases. In addition, when the migrated MC user makes a call, then only the migrated MC user's functional alias from the primary MC system will be shown, which can contain irrelevant information or can even be misleading.

In the following, different exemplifying embodiments will be described using, as an example of a communication network to which examples of embodiments may be applied, a communication network architecture based on 3GPP standards for a communication network, such as a 5G/NR, without restricting the embodiments to such an architecture, however. It is obvious for a person skilled in the art that the embodiments may also be applied to other kinds of communication networks where mobile communication principles are integrated, e.g. Wi-Fi, worldwide interoperability for microwave access (WiMAX), Bluetooth®, personal communications services (PCS), ZigBee®, wideband code division multiple access (WCDMA), systems using ultra-wideband (UWB) technology, mobile ad-hoc networks (MANETs), wired access, etc. Furthermore, without loss of generality, the description of some examples of embodiments is related to a mobile communication network, but principles of the disclosure can be extended and applied to any other type of communication network, such as a wired communication network.

The following examples and embodiments are to be understood only as illustrative examples. Although the specification may refer to "an", "one", or "some" example(s) or embodiment(s) in several locations, this does not necessarily mean that each such reference is related to the same example(s) or embodiment(s), or that the feature only applies to a single example or embodiment. Single features of different embodiments may also be combined to provide other embodiments. Furthermore, terms like "comprising" and "including" should be understood as not limiting the described embodiments to consist of only those features that have been mentioned; such examples and embodiments may also contain features, structures, units, modules etc. that have not been specifically mentioned.

A basic system architecture of a (tele)communication network including a mobile communication system where some examples of embodiments are applicable may include an architecture of one or more communication networks including wireless access network subsystem(s) and core network(s). Such an architecture may include one or more communication network control elements or functions, access network elements, radio access network elements, access service network gateways or base transceiver stations, such as a base station (BS), an access point (AP), a NodeB (NB), an eNB or a gNB, a distributed or a centralized unit, which controls a respective coverage area or cell(s) and with which one or more communication stations such as communication elements or functions, like user devices or terminal devices, like a UE, or another device having a similar function, such as a modem chipset, a chip, a module etc., which can also be part of a station, an element, a function or an application capable of conducting a communication, such as a UE, an element or function usable in a machine-to-machine communication architecture, or attached as a separate element to such an element, function or application capable of conducting a communication, or the like, are capable to communicate via one or more channels via one or more communication beams for transmitting several types of data in a plurality of access domains. Furthermore, core network elements or network functions, such as gateway network elements/functions, mobility management entities, a mobile switching center, servers, databases and the like may be included.

The general functions and interconnections of the described elements and functions, which also depend on the actual network type, are known to those skilled in the art and described in corresponding specifications, so that a detailed description thereof is omitted herein. However, it is to be noted that several additional network elements and signaling links may be employed for a communication to or from an element, function or application, like a communication endpoint, a communication network control element, such as a server, a gateway, a radio network controller, and other elements of the same or other communication networks besides those described in detail herein below.

A communication network architecture as being considered in examples of embodiments may also be able to communicate with other networks, such as a public switched telephone network or the Internet. The communication network may also be able to support the usage of cloud services for virtual network elements or functions thereof, wherein it is to be noted that the virtual network part of the telecommunication network can also be provided by non-cloud resources, e.g. an internal network or the like. It should be appreciated that network elements of an access system, of a core network etc., and/or respective functionalities may be implemented by using any node, host, server, access node or entity etc. being suitable for such a usage. Generally, a network function can be implemented either as a network element on a dedicated hardware, as a software instance running on a dedicated hardware, or as a virtualized function instantiated on an appropriate platform, e.g., a cloud infrastructure.

Furthermore, a network element, such as communication elements, like a UE, a terminal device, control elements or functions, such as access network elements, like a base station (BS), an gNB, a radio network controller, a core network control element or function, such as a gateway element, or other network elements or functions, as described herein, and any other elements, functions or applications may be implemented by software, e.g. by a computer program product for a computer, and/or by hardware. For executing their respective processing, correspondingly used devices, nodes, functions or network elements may include several means, modules, units, components, etc. (not shown) which are required for control, processing and/or communication/signaling functionality. Such means, modules, units and components may include, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means including e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

It should be appreciated that according to some examples, a so-called "liquid" or flexible network concept may be employed where the operations and functionalities of a network element, a network function, or of another entity of the network, may be performed in different entities or functions, such as in a node, host or server, in a flexible manner. In other words, a "division of labor" between involved network elements, functions or entities may vary case by case.

Referring now to FIG. 1, there is shown a flow chart illustrating steps corresponding to a method according to examples of embodiments.

In particular, according to FIG. 1, in S110, a set of substitute functions is configured. Further, in case a migration request is received (S111: YES), a service user profile associated with the migration request is requested in S120. In case of no migration request being received (S111: NO), no further processing is performed. Furthermore, in case a requested service user profile is received (S121: YES), a modified service user profile comprising the set of substitute functions is created in S130 based on the requested service user profile. In case of the requested service user profile not being received (S121: NO), no further processing is performed. In addition, in S140, the modified service user profile is provided. It is to be noted that in case of a set of substitute functions already being configured and/or no updating/adapting of this set of substitute functions being required/intended, S110 may be omitted.

According to various examples of embodiments, the method may refer to controlling and/or handling services after a migration process, related e.g. to migration of a terminal endpoint device, wherein the terminal endpoint device e.g. migrates from a first network system to a second network system. Specifically, the method may be applied by an apparatus allocated to the second network system. Further, the first network system may refer to a primary MC system and the second network system may refer to a partner MC system. In addition, the apparatus may refer to a configuration management server allocated to the partner MC system. The terminal endpoint device may refer to a user equipment or MC user equipment.

Optionally, according to various examples of embodiments, the method further comprises the steps of creating the modified service user profile by adding the set of substitute functions to the requested service user profile.

Alternatively, according to at least some examples of embodiments, the method may further comprise the steps of configuring an artificial service user profile comprising the set of substitute functions, assessing whether a terminal endpoint device associated with the migration request has the artificial service user profile configured, and, if the terminal endpoint device has the artificial service user profile configured, creating the modified service user profile by adding the set of substitute functions from the artificial service user profile to the requested service user profile.

Moreover, according to various examples of embodiments, the method may further comprise the steps of configuring the set of substitute functions being associated with a network system to allow for using services in the associated network system based on the set of substitute functions.

Furthermore, according to at least some examples of embodiments, the method may further comprise the steps of configuring a plurality of sets of substitute functions, wherein each set of substitute functions out of the plurality of sets of substitute functions is associated with a different network system out of a plurality of network systems. The method then further comprises the steps of creating the modified service user profile to comprise one set of substitute functions out of the plurality of sets of substitute functions, based on the migration request.

The above mentioned features, either alone or in combination, allow for controlling and/or handling services after a migration process. Specifically, the above mentioned features, either alone or in combination, allow for handling services after MC user migration.

Figure 2:
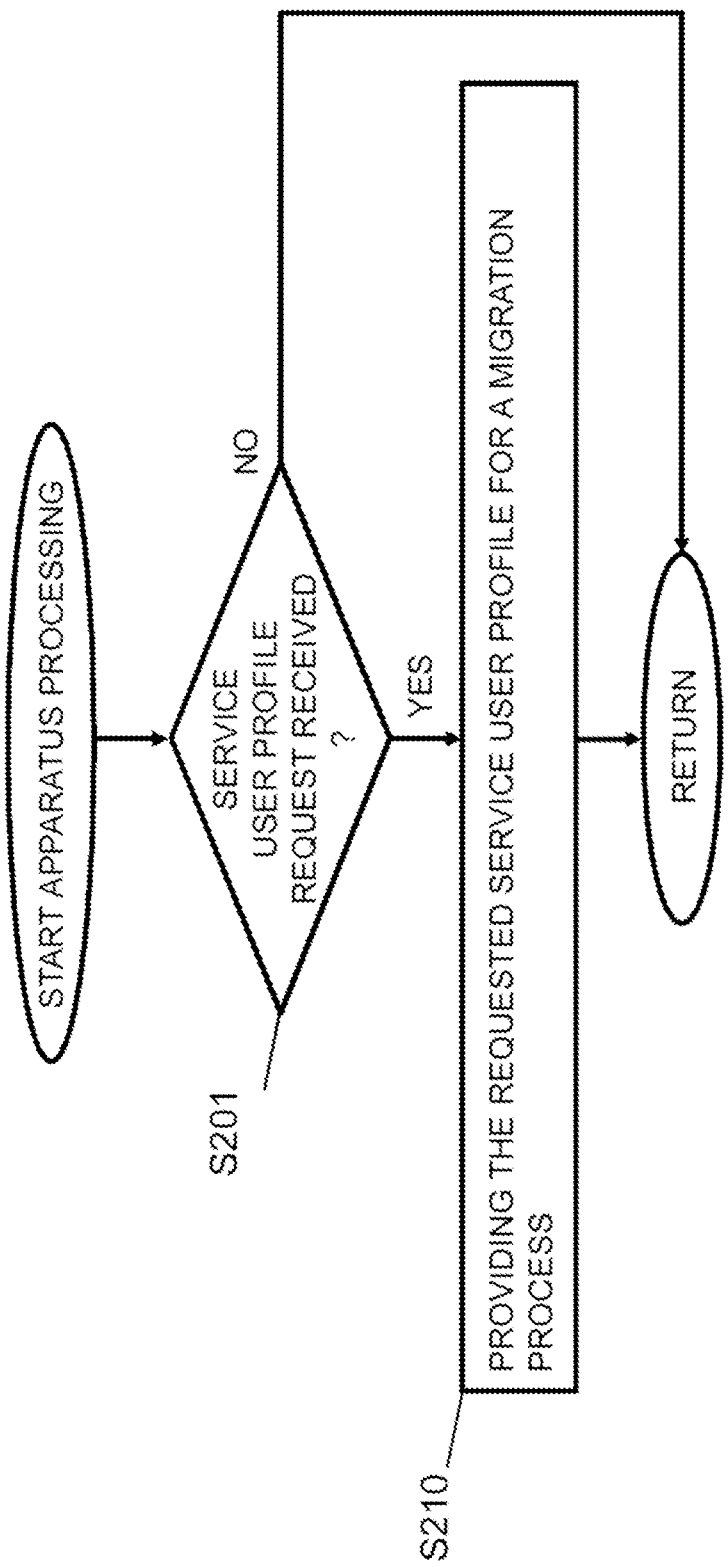
FIG. 2 shows a flow chart illustrating steps corresponding to a method according to examples of embodiments.

Referring now to FIG. 2, there is shown a flow chart illustrating steps corresponding to a method according to examples of embodiments In particular, according to FIG. 2, in case a service user profile request for a migration process is received (S201: YES), the requested service user profile for the migration process is provided in S210. In case no service user profile request for a migration process is received (S201: NO), no further processing is performed.

According to various examples of embodiments, the method may refer to supporting to handle services for a migration process, related e.g. to migration of a terminal endpoint device, wherein the terminal endpoint device e.g. migrates from a first network system to a second network system. Specifically, the method may be applied by an apparatus allocated to the first network system. Further, the first network system may refer to a primary MC system and the second network system may refer to a partner MC system. In addition, the apparatus may refer to a configuration management server allocated to the primary MC system. The terminal endpoint device may refer to a user equipment or MC user equipment.

The above mentioned features, either alone or in combination, allow for supporting a handling of services relevant for a migration process. Specifically, for migration of a MC user.

Figure 3:
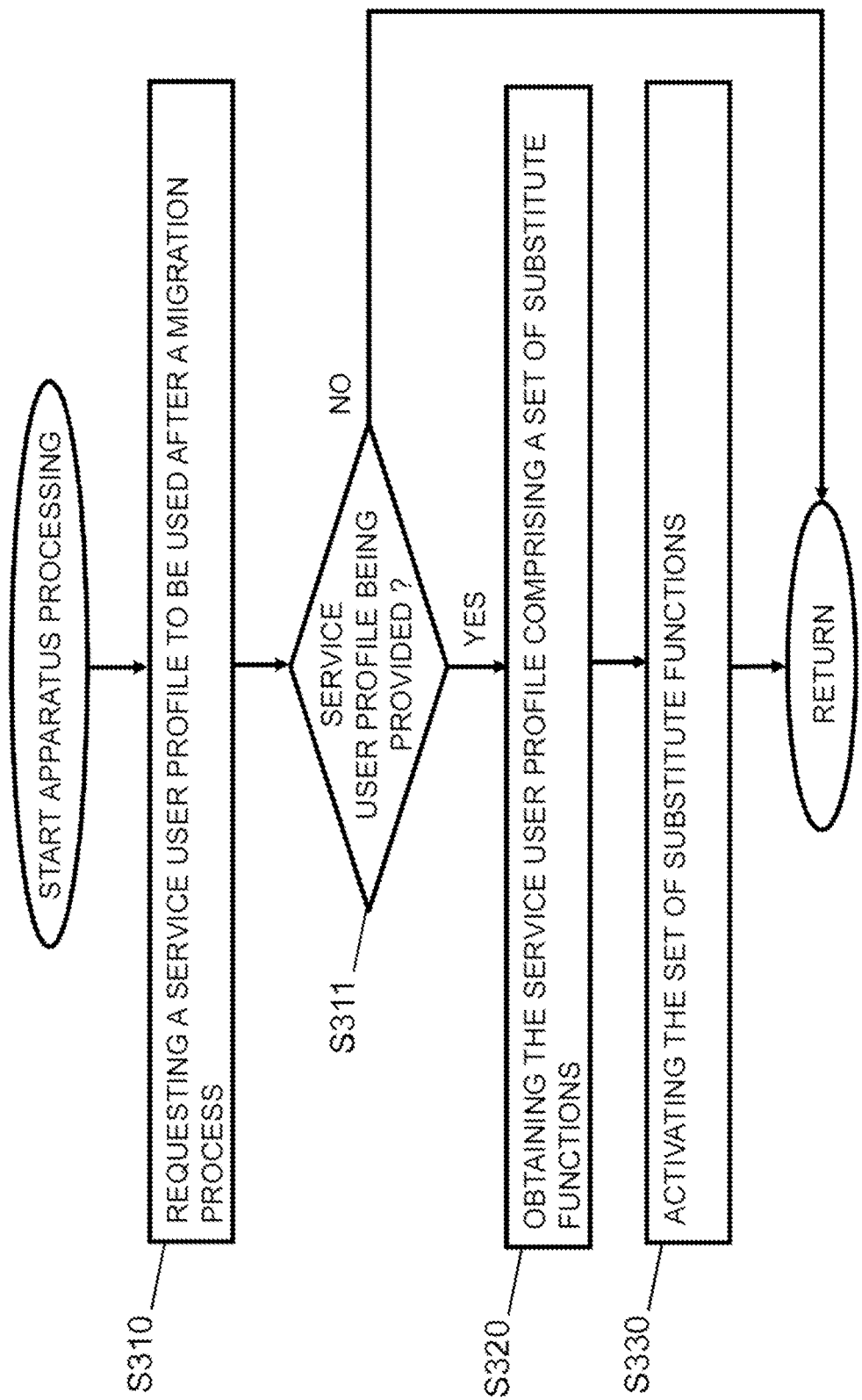
FIG. 3 shows a flow chart illustrating steps corresponding to a method according to examples of embodiments.

Referring not now FIG. 3, there is shown a flow chart illustrating steps corresponding to a method for use by an apparatus allocated to a second network system according to examples of embodiments.

Specifically, according to FIG. 3, in S310, a service user profile to be used after a migration process is requested. Subsequently, in case of the service user profile being provided (S311: YES), the service user profile is obtained in S320, wherein the service user profile comprises a set of substitute functions. In case of no service user profile being provided (S311: NO), no further processing is performed. Furthermore, in S330, the set of substitute functions is activated.

According to various examples of embodiments, the method may refer to handling and/or activating services related to a migration process, related e.g. to migration of a terminal endpoint device, wherein the terminal endpoint device e.g. migrates from a first network system to a second network system. Specifically, the method may be applied by an apparatus allocated to the first network system and migrating to the second network system. Further, the first network system may refer to a primary MC system and the second network system may refer to a partner MC system. In addition, the apparatus may refer to a terminal endpoint device allocated, before migration, to the primary MC system. The terminal endpoint device may refer to a user equipment or MC user equipment.

Optionally, according to at least some examples of embodiments, the method may further comprise the steps of, if an artificial service user profile being configured, obtaining the service user profile comprising the set of substitute functions from the artificial service user profile.

Furthermore, according to various examples of embodiments, the method may further comprise the steps of using services provided in a target network system associated with the migration process, based on the activated set of substitute functions.

The above mentioned features, either alone or in combination, allow for handling and/or activating services after a migration process, e.g. related to a migration of a terminal endpoint device. Specifically, the above mentioned features, either alone or in combination, allow for activating and using provided services in a partner MC system after migration of the MC user equipment into the partner MC system.

Figure 4:
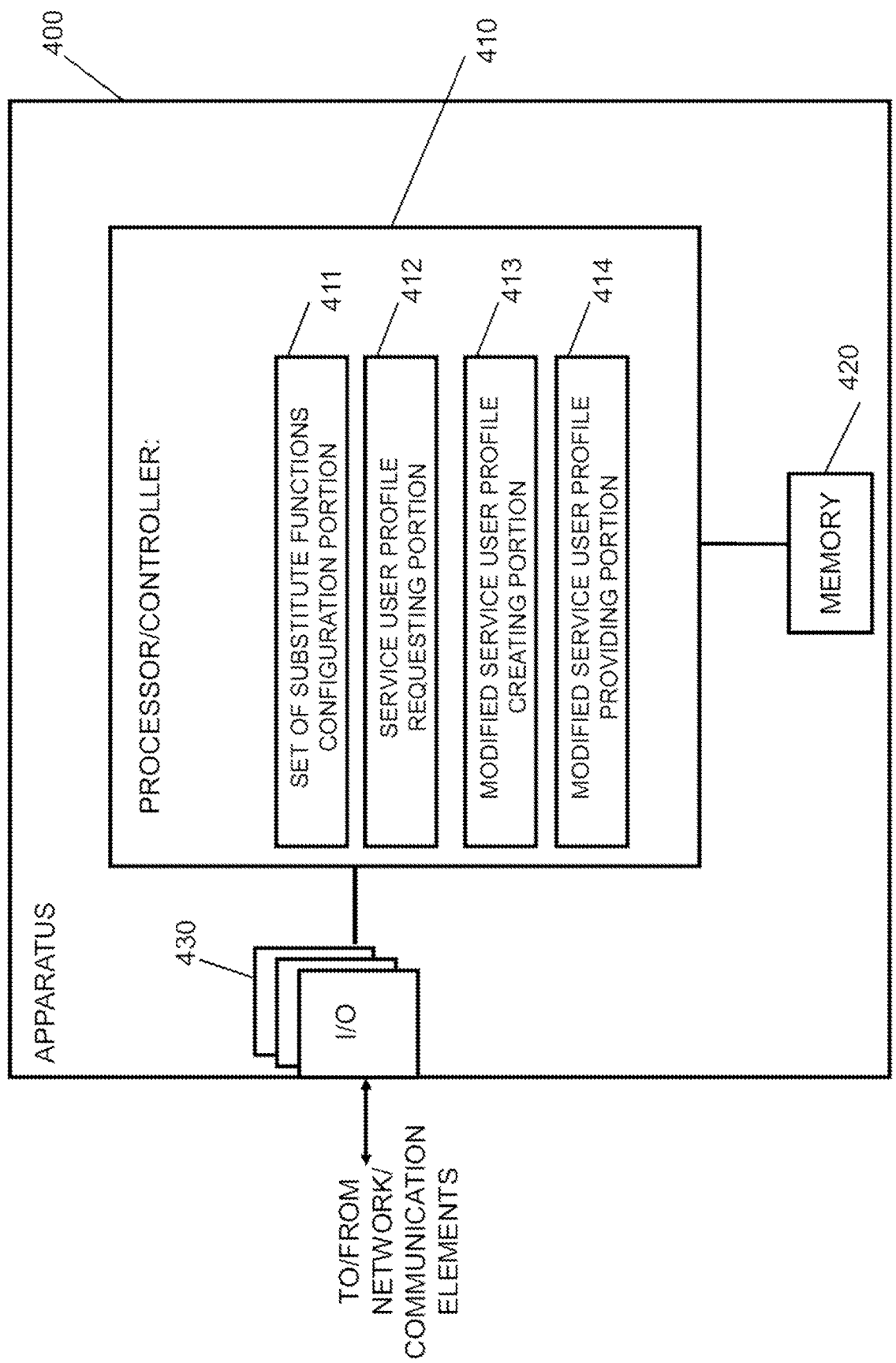
FIG. 4 shows a block diagram illustrating an apparatus according to examples of embodiments.

Referring now to FIG. 4, FIG. 4 shows a block diagram illustrating an apparatus 400, e.g. an apparatus 400 allocated to a second network system, wherein the second network system e.g. refers to a partner MC system. The apparatus 400 e.g. refers to a configuration management server and is e.g. configured to handle services after migration of a terminal endpoint device to the first network system according to examples of embodiments. It is to be noted that the apparatus 400 may include further elements or functions besides those described herein below. Furthermore, even though reference is made to an apparatus, the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The apparatus 400 shown in FIG. 4 may include a processing circuitry, a processing function, a control unit or a processor 410, such as a CPU or the like, which is suitable to control a migration process. The processor 410 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference sign 430 denotes an input/output (I/O) unit or function (interfaces) connected to the processor or processing function 410. The I/O unit 430 may be used for communicating with network entities/communication elements. Reference sign 420 denotes a memory usable, for example, for storing data and programs to be executed by the processor or processing function 410 and/or as a working storage of the processor or processing function 410. It is to be noted that the memory 420 may be implemented by using one or more memory portions of the same or different type of memory. In addition, the memory 420 may refer to a database, e.g. a MC service user database, allocated to the second network system, e.g. a partner MC system, thus the memory 420 may be connected/linked to the apparatus 400, but not comprised by the apparatus 400.

The processor or processing function 410 is configured to execute processing related to the above described method. In particular, the processor or processing circuitry or function 410 includes one or more of the following sub-portions. Sub-portion 411 is a processing portion which is usable as a portion for configuration of a set of substitute functions. The portion 411 may be configured to perform processing according to S110 of FIG. 1. Furthermore, the processor or processing circuitry or function 410 may include a sub-portion 412 usable as a portion for requesting a service user profile associated with a migration request. The portion 412 may be configured to perform a processing according to S120 of FIG. 1. In addition, the processor or processing circuitry or function 410 may include a sub-portion 413 usable as a portion for creating, based on the requested service user profile, a modified service user profile comprising the set of substitute functions. The portion 413 may be configured to perform a processing according to S130 of FIG. 1. Moreover, the processor or processing circuitry or function 410 may include a sub-portion 414 usable as a portion for providing a modified service user profile. The portion 414 may be configured to perform a processing according to S140 of FIG. 1.

Figure 5:
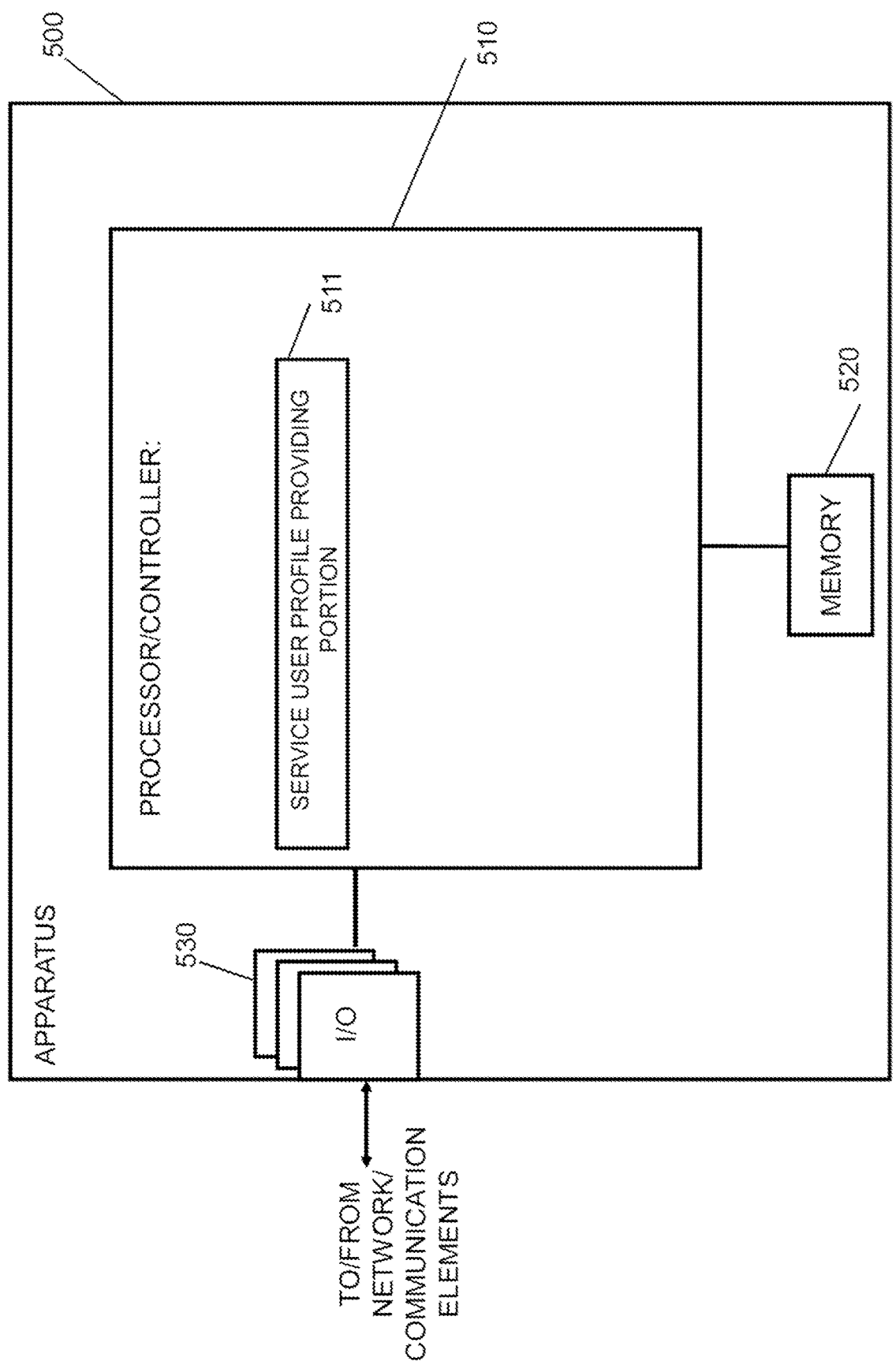
FIG. 5 shows a block diagram illustrating an according to examples of embodiments.

Referring now to FIG. 5, there is shown, according to examples of embodiments, a block diagram illustrating an apparatus 500, e.g. an apparatus 500 allocated to a first network system, wherein the first network system e.g. refers to a primary MC system. The apparatus 500 e.g. refers to a configuration management server and is e.g. configured to support a migration process, e.g. migration of a terminal endpoint device from the first network system according to examples of embodiments. It is to be noted that the apparatus 500 may include further elements or functions besides those described herein below. Furthermore, even though reference is made to a communication element or function, the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The apparatus 500 shown in FIG. 5 may include a processing circuitry, a processing function, a control unit or a processor 510, such as a CPU or the like, which is suitable to support a migration process, e.g. of a terminal endpoint device, e.g. from a primary MC system to a partner MC system. The processor 510 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference sign 530 denotes an input/output (I/O) unit or function (interfaces) connected to the processor or processing function 510. The I/O unit 530 may be used for communicating with network entities/communication elements. Reference sign 520 denotes a memory usable, for example, for storing data and programs to be executed by the processor or processing function 510 and/or as a working storage of the processor or processing function 510. It is to be noted that the memory 520 may be implemented by using one or more memory portions of the same or different type of memory. In addition, the memory 520 may refer to a database, e.g. a MC service user database, allocated to the second network system, e.g. a primary MC system, thus the memory 520 may be connected/linked to the apparatus 500, but not comprised by the apparatus 500.

The processor or processing function 510 is configured to execute processing related to the above described communication control processing. In particular, the processor or processing circuitry or function 510 includes one or more of the following sub-portions. Sub-portion 511 is a processing portion which is usable as a portion for providing a requested service user profile for a migration process.

The portion 511 may be configured to perform processing according to S210 of FIG. 2.

Figure 6:
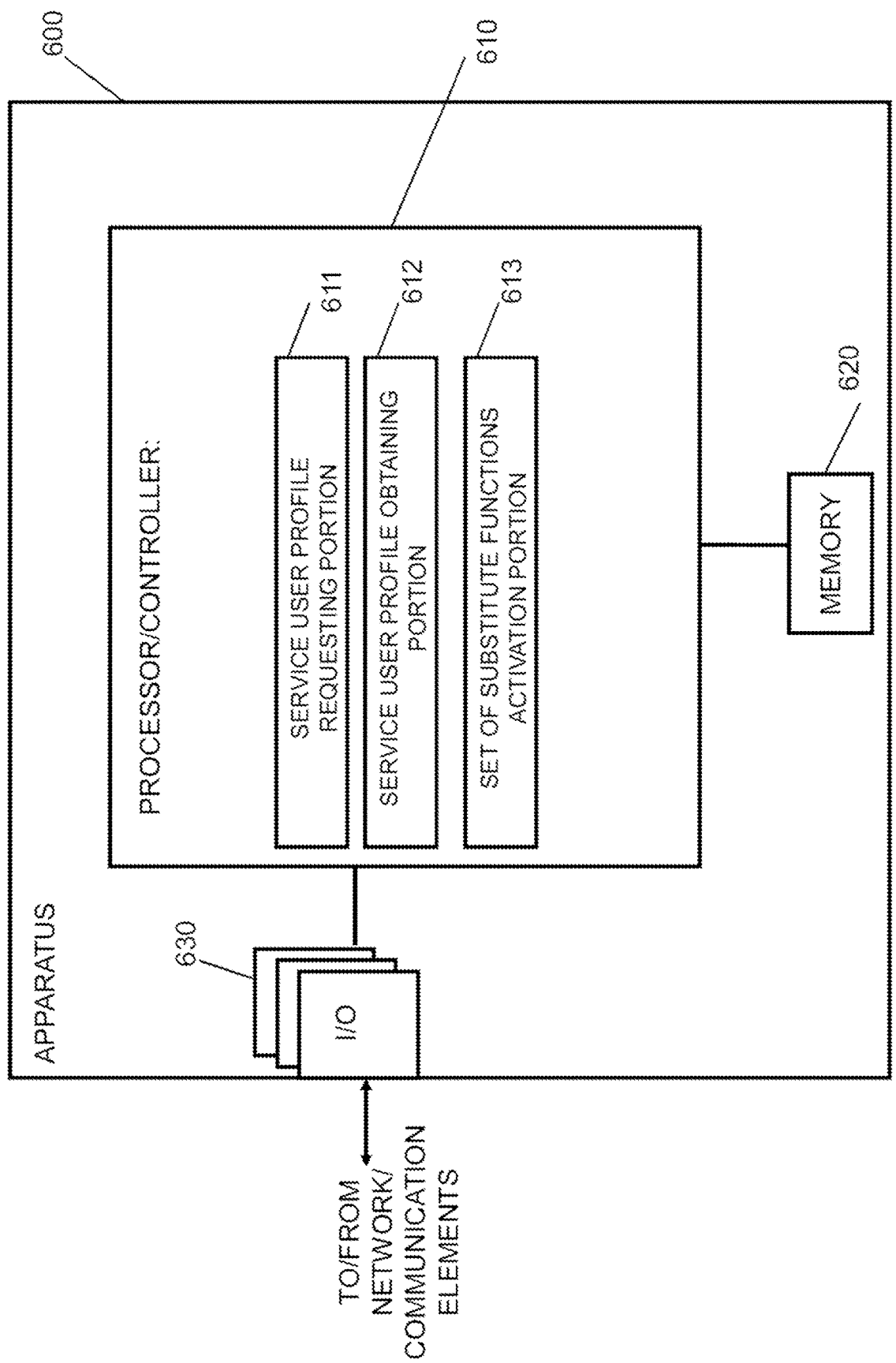
FIG. 6 shows a block diagram illustrating an apparatus according to examples of embodiments.

Referring now to FIG. 6, there is shown, according to examples of embodiments, a block diagram illustrating an apparatus 600, e.g. an apparatus 600 allocated to a first network system, wherein the first network system e.g. refers to a primary MC system. The apparatus 600 e.g. refers to a terminal endpoint device, such as a user equipment or a MC user equipment, and may migrate from the first network system to a second network system, wherein the second network system e.g. refers to a partner MC system. It is to be noted that the apparatus 600 may include further elements or functions besides those described herein below. Furthermore, even though reference is made to a communication element or function, the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The apparatus 600 shown in FIG. 6 may include a processing circuitry, a processing function, a control unit or a processor 610, such as a CPU or the like, which is/are suitable to be involved in a migration process, e.g. when the apparatus 600 migrates from a primary MC system to a partner MC system. The processor 610 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference sign 630 denotes an input/output (I/O) unit or function (interfaces) connected to the processor or processing function 610. The I/O unit 630 may be used for communicating with network entities/communication elements. Reference sign 620 denotes a memory usable, for example, for storing data and programs to be executed by the processor or processing function 610 and/or as a working storage of the processor or processing function 610. It is to be noted that the memory 620 may be implemented by using one or more memory portions of the same or different type of memory.

The processor or processing function 610 is configured to execute processing related to the above described communication control processing. In particular, the processor or processing circuitry or function 610 includes one or more of the following sub-portions. Sub-portion 611 is a processing portion which is usable as a portion for requesting a service user profile to be used by the apparatus 600 after migration of the apparatus 600. The portion 611 may be configured, to perform processing according to S310 of FIG. 3. Sub-portion 612 is a processing portion which is usable as a portion for obtaining the service user profile. The portion 612 may be configured to perform processing according to S320 of FIG. 3. Sub-portion 613 is a processing portion which is usable as a portion for activating a set of substitute functions comprised by the requested service user profile. The portion 613 may be configured to perform processing according to S330 of FIG. 3.

Figure 7:
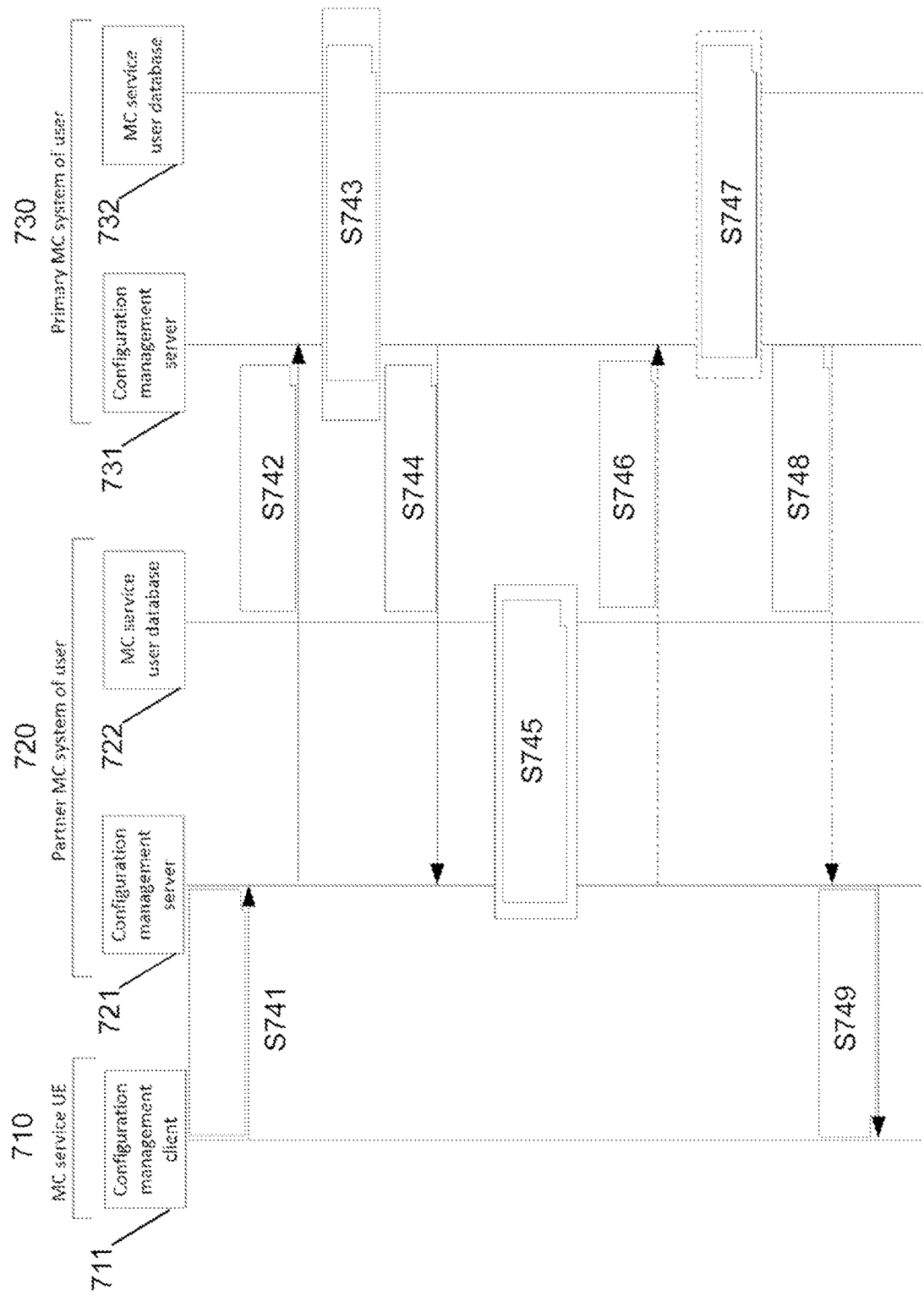
FIG. 7 shows an implementation example illustrating a mechanism involving apparatuses allocated to different network systems according to examples of embodiments.

Referring now to FIG. 7, there is shown an implementation example according to examples of embodiments. Particularly, FIG. 7 shows a mechanism for a configuration management client 711 comprised by a MC service UE 710, wherein the configuration management client 711 e.g. refers to the apparatus 600 according to FIG. 6, to retrieve a MC service user profile for a migrating MC service user from a partner MC system 720. The partner MC system 720 e.g. represents a second network system and comprises at least a configuration management server 721, which e.g. refers to the apparatus 400 according to FIG. 4, and a MC service user database 722, which may be illustrated by the memory unit 420 according to FIG. 4. FIG. 7 further illustrates a primary MC system 730, which e.g. represents a first network system, comprising at least a configuration management server 731, which e.g. refers to the apparatus 500 according to FIG. 5, and a MC service user database 732, which may be illustrated by the memory unit 520 according to FIG. 5.

Specifically, according to FIG. 7, in S741 the configuration management client 711 in the MC service UE 710 of the migrating MC service user requests the MC service user profile for migration from the configuration management server 721 in the partner MC system 720. In S742, the configuration management server 721 in the partner MC system 720 requests the MC service user profile from the configuration management server 731 in the primary MC system 730 of the MC service user. In S743, the configuration management server 731 in the primary MC system 730 of the MC service user retrieves the MC service user profile from the MC service user database 732 in that primary MC system 730. The identification of the partner MC system 720 to which the MC service user is attempting to migrate is used to determine which MC service user profile is retrieved for that MC service user for migration to that partner MC system 720. In S744, the configuration management server 731 in the primary MC system 730 provides the MC service user profile to the configuration management server 721 in the partner MC system 720 of the MC service user, optionally requesting validation of the modified MC service user profile.

In S745, the partner MC system 720 of the MC service user modifies the MC service user profile according to local configuration information and stores the modified MC service user profile in the MC service user database 722 in the partner MC system 720. Particularly, in S745, the MC service user profile is modified by adding a set of functional aliases (such as a set of substitute functions), as detailed herein below. Alternatively, as described below in more detail, the partner MC system 720 may configure a 'ghost' profile comprising the set of functional aliases and modify, after migration of the MC user, the MC service user profile by adding the set of functional aliases from the 'ghost' profile.

In S746, if the primary MC system 730 requested validation of the MC service user profile in S744, the configuration management server 721 in the partner MC system 720 of the migrating MC service user may send the modified MC service user profile to the configuration management server 731 of the primary MC system 730 of the MC service user to allow the primary MC system 730 of the MC service user to validate the modified MC service user profile. In S747, the primary MC system 730 of the migrated MC service user validates the modified MC service profile of the migrated MC service user. In S748, the primary MC system 730 of the migrated MC service user responds to the partner MC system 720 with the results of the validation process. In S749, the configuration management server 721 in the partner MC system 720 provides the MC service user profile to the configuration management client of the migrating MC service user.

Furthermore, in view of FIG. 7, it is to be noted that the functional alias management server functionality is provided by MCPTT configuration management server. Configuration management server functionality shall be extended with the configuration possibility of functional alias sets for different partner MC system (see FIG. 7, S745). The functional alias set configured to a certain MC partner system 720 will be added to the MC user profile of the migrated MC user from the partner MC system 720. Here, different migrated MC users from different partner MC systems 720 may need a different functional alias set, with the configuration possibility being on MC partner system basis.

Particularly referring to FIG. 7, S745, there is provided the possibility of modifying the user profile of the migrated MC user. As disclosed herein, this step is extended with the addition of preconfigured functional aliases configured to the MC system from which the user is migrated. After the functional aliases are added to the user profile, these functional aliases will be available for the MC user and the user will be able to activate these functional aliases from the partner MC system 720 in order to be able to communicate with users from the partner MC system 720. Other MC users will be capable to call the migrated MC user and the migrated MC user's functional alias will be shown to the called/calling MC users.

Further, according to various examples of embodiments, 'ghost' MC user profiles (such as artificial service user profiles) for future migrated MC users may be configured and the relevant functional aliases may be added to this 'ghost' profile. After the MC user is migrated from the primary MC system 730, the partner MC system 720 shall check/assess (also in S745 according to FIG. 7) whether the migrating MC user has a 'ghost' profile configured and if so, then shall add the functional aliases from the 'ghost' profile to the real profile (service user profile requested from the primary MC system) of the migrated MC user. This solution would offer even more precise/strict configuration possibility as the partner MC system 720 could configure only the couple of relevant functional aliases per migrated MC user.

In view of e.g. FIG. 7, the present disclosure is about to have a set of functional aliases for each primary MC system 730 in the partner MC system 720. After the MC user is migrated from primary MC system 730 to the partner MC system 720, the partner MC system 720 shall extend the MC user profile with a preconfigured set of functional aliases to allow the usage of local functional aliases for the migrated MC user. The preconfigured set of functional aliases can be different based on the identification and access information of different primary MC systems 730. Additionally, there can be 'ghost' MCPTT IDs configured which will be migrated later and functional aliases for these MCPTT IDs can be configured.

Referring to the term 'ghost' profile, the term 'ghost' means that the user profile is assigned for migrating users and this 'ghost' profile will be allocated to them after migration. The 'ghost' profile is not necessarily configured individually for all the future migrating users, but there can be one 'ghost' profile for all the users that migrate from one particular primary MC system 730. Thus, there can be different 'ghost' profiles based on the origin (primary MC system 730) from where the user is migrated. The 'ghost' profile as disclosed herein contains the functional aliases, which can be registered by the migrated MC user.

It should be appreciated that an access technology via which traffic is transferred to and from an entity in the communication network may be any suitable present or future technology, such as WLAN (Wireless Local Access Network), WiMAX (Worldwide Interoperability for Microwave Access), LTE, LTE-A, 5G, Bluetooth, Infrared, and the like may be used; additionally, embodiments may also apply wired technologies, e.g. IP based access technologies like cable networks or fixed lines.

embodiments suitable to be implemented as software code or portions of it and being run using a processor or processing function are software code independent and can be specified using any known or future developed programming language, such as a high-level programming language, such as objective-C, C, C++, C#, Java, Python, Javascript, other scripting languages etc., or a low-level programming language, such as a machine language, or an assembler.

implementation of embodiments is hardware independent and may be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), and/or TTL (Transistor-Transistor Logic).

embodiments may be implemented as individual devices, apparatuses, units, means or functions, or in a distributed fashion, for example, one or more processors or processing functions may be used or shared in the processing, or one or more processing sections or processing portions may be used and shared in the processing, wherein one physical processor or more than one physical processor may be used for implementing one or more processing portions dedicated to specific processing as described, an apparatus may be implemented by a semiconductor chip, a chipset, or a (hardware) module including such chip or chipset;

embodiments may also be implemented as any combination of hardware and software, such as ASIC (Application Specific IC (Integrated Circuit)) components, FPGA (Field-programmable Gate Arrays) or CPLD (Complex Programmable Logic Device) components or DSP (Digital Signal Processor) components.

embodiments may also be implemented as computer program products, including a computer usable medium having a computer readable program code embodied therein, the computer readable program code adapted to execute a process as described in embodiments, wherein the computer usable medium may be a non-transitory medium.

Although the present disclosure has been described herein before with reference to particular embodiments thereof, the present disclosure is not limited thereto and various modifications can be made thereto.

There is disclosed an apparatus comprising at least one processing circuitry, and at least one memory for storing instructions to be executed by the processing circuitry. The at least one memory and the instructions are configured to, with the at least one processing circuitry, cause the apparatus at least to configure a set of substitute functions. The apparatus is further caused to request a service user profile associated with a migration request. Still further, the apparatus is caused to create, based on the requested service user profile, a modified service user profile comprising the set of substitute functions, and to provide the modified service user profile.

The invention claimed is:

1. An apparatus comprising:
at least one processor; and
at least one memory comprising instructions stored thereon that, when executed by the at least one processor, cause the apparatus to perform at least:
configuring a second set of substitute functions;
requesting a mission critical service user profile associated with a migration request,
wherein the mission critical service user profile comprising a first set of substitute functions;
creating, based on the mission critical service user profile requested, a modified mission critical service user profile,
wherein the modified mission critical service user profile comprises the second set of substitute functions; and
providing the modified mission critical service user profile,
wherein the first set of substitute functions comprises a first set of functional aliases,
wherein the second set of substitute functions comprises a second set of functional aliases, and
wherein the first set of functional aliases is different from the second set of functional aliases.

2. The apparatus of claim 1, wherein the instructions stored on the at least one memory, when executed by the at least one processor, further cause the apparatus to perform:
creating the modified mission critical service user profile by adding the second set of substitute functions to the mission critical service user profile requested.

3. The apparatus of claim 1, wherein the instructions stored on the at least one memory, when executed by the at least one processor, further cause the apparatus to perform:
configuring an artificial mission critical service user profile comprising the second set of substitute functions;
assessing whether a terminal endpoint device associated with the migration request has the artificial mission critical service user profile configured; and
in an instance in which the terminal endpoint device has the artificial mission critical service user profile configured, creating the modified mission critical service user profile by adding the second set of substitute functions from the artificial mission critical service user profile to the mission critical service user profile requested.

4. The apparatus of claim 1, wherein the instructions stored on the at least one memory, when executed by the at least one processor, further cause the apparatus to perform:
configuring the second set of substitute functions associated with a network system to allow for using services in the associated network system based on the second set of substitute functions.

5. The apparatus of claim 1, wherein the instructions stored on the at least one memory, when executed by the at least one processor, further cause the apparatus to perform:
configuring a plurality of second sets of substitute functions,
wherein each second set of substitute functions out of the plurality of second sets of substitute functions is associated with a different network system from among a plurality of network systems; and
creating the modified mission critical service user profile to comprise one second set of substitute functions from among the plurality of second sets of substitute functions, based on the migration request,
wherein the plurality of second sets of substitute functions is a plurality of second sets of functional aliases.

6. An apparatus comprising:
at least one processor; and
at least one memory comprising instructions stored thereon that, when executed by the at least one processor, cause the apparatus to perform at least:
receiving a request for a mission critical service user profile from a terminal device configured for a first set of substitute functions; and
providing, for the terminal device, the mission critical service user profile for a migration process,
wherein the mission critical service user profile comprises a second set of substitute functions,
wherein the first set of substitute functions comprises a first set of functional aliases,
wherein the second set of substitute functions comprises a second set of functional aliases, and
wherein the first set of functional aliases is different from the second set of functional aliases.

7. An apparatus comprising:
at least one processor; and
at least one memory comprising instructions stored thereon that, when executed by the at least one processor, cause the apparatus to perform at least:
while the apparatus is configured with a first set of substitute functions, requesting a mission critical service user profile to be used by the apparatus after migration of the apparatus;
obtaining the mission critical service user profile,
wherein the mission critical service user profile comprises a second set of substitute functions; and
activating the second set of substitute functions,
wherein the first set of substitute functions is a first set of functional aliases,
wherein the second set of substitute functions is a second set of functional aliases, and
wherein the second set of functional aliases is different from the first set of functional aliases.

8. The apparatus of claim 7, wherein the instructions stored on the at least one memory, when executed by the at least one processor, further cause the apparatus to perform:
in an instance in which the apparatus has an artificial mission critical service user profile configured, obtaining the mission critical service user profile comprising the second set of substitute functions from the artificial mission critical service user profile.

9. The apparatus of claim 7, wherein the instructions stored on the at least one memory, when executed by the at least one processor, further cause the apparatus to perform:
using services provided in a network system into which the apparatus migrated, based on the second set of substitute functions that were activated.

10. A method comprising:
configuring a second set of substitute functions;
requesting a mission critical service user profile associated with a migration request,
wherein the mission critical service user profile comprises a first set of substitute functions;
creating, based on the mission critical service user profile requested, a modified mission critical service user profile,
wherein the modified mission critical service user profile comprises the second set of substitute functions; and
providing the modified mission critical service user profile,
wherein the first set of substitute functions comprise a first set of functional aliases,
wherein the second set of substitute functions comprise a second set of functional aliases, and
wherein the first set of functional aliases is different from the second set of functional aliases.

11. The method of claim 10, further comprising:
creating the modified mission critical service user profile by adding the second set of substitute functions to the mission critical service user profile requested.

12. The method of claim 10, further comprising:
configuring an artificial mission critical service user profile comprising the second set of substitute functions;
assessing whether a terminal endpoint device associated with the migration request has the artificial mission critical service user profile configured; and
in an instance in which the terminal endpoint device has the artificial mission critical service user profile configured, creating the modified mission critical service user profile by adding the second set of substitute functions from the artificial mission critical service user profile to the mission critical service user profile requested.

13. The method of claim 10, further comprising:
configuring the second set of substitute functions associated with a network system to allow for using services in the associated network system based on the second set of substitute functions.

14. The method of claim 10, further comprising configuring a plurality of second sets of substitute functions,
wherein each second set of substitute functions from among the plurality of second sets of substitute functions is associated with a different network system from among a plurality of network systems; and
creating the modified mission critical service user profile,
wherein the modified mission critical service user profile comprises one second set of substitute functions from among the plurality of second sets of substitute functions, based on the migration request.

15. A method comprising:
receiving a request for a mission critical service user profile from a terminal device configured for a first set of substitute functions; and
providing, for the terminal device, the mission critical service user profile for a migration process, wherein the mission critical service user profile comprises a second set of substitute functions,
wherein the first set of substitute functions comprises a first set of functional aliases,
wherein the second set of substitute functions comprises a second set of functional aliases, and
wherein the first set of functional aliases is different from the second set of functional aliases.

16. A method comprising:
while a first set of substitute functions are configured, requesting a mission critical service user profile to be used after a migration process;
obtaining the mission critical service user profile,
wherein the mission critical service user profile comprises a second set of substitute functions; and
activating the second set of substitute functions,
wherein the first set of substitute functions is a first set of functional aliases,
wherein the second set of substitute functions is a second set of functional aliases, and
wherein the second set of functional aliases is different from the first set of functional aliases.

17. The method of claim 16, further comprising:
in an instance in which an artificial mission critical service user profile is configured, obtaining the mission critical service user profile comprising the second set of substitute functions from the artificial mission critical service user profile.

18. The method of claim 16 further comprising:
using services provided in a target network system associated with the migration process, based on the second set of substitute functions activated.

19. A non-transitory computer-readable storage medium comprising instructions stored thereon that, when executed by at least one processor of an apparatus, cause the apparatus to perform at least:
configuring a second set of substitute functions;
requesting a mission critical service user profile associated with a migration request,
wherein the mission critical service user profile comprises a first set of substitute functions;
creating, based on the mission critical service user profile requested, a modified mission critical service user profile,
wherein the modified mission critical service user profile comprises the second set of substitute functions; and
providing the modified mission critical service user profile,
wherein the first set of substitute functions comprise a first set of functional aliases,
wherein the second set of substitute functions comprise a second set of functional aliases, and
wherein the first set of functional aliases is different from the second set of functional aliases.

20. A non-transitory computer-readable storage medium comprising instruction stored thereon that, when executed by at least one processor of an apparatus, cause the apparatus to perform at least:
while a first set of substitute functions are configured, requesting a mission critical service user profile to be used after a migration process;
obtaining the mission critical service user profile,
wherein the mission critical service user profile comprises a second set of substitute functions; and
activating the second set of substitute functions,
wherein the first set of substitute functions is a first set of functional aliases,
wherein the second set of substitute functions is a second set of functional aliases, and
wherein the second set of functional aliases is different from the first set of functional aliases.

21. An apparatus comprising:
at least one processor; and
at least one memory comprising instructions stored thereon that, when executed by the at least one processor, cause the apparatus to perform at least:
requesting a mission critical service user profile,
wherein the mission critical service user profile comprises a first set of substitute functions, and
wherein the first set of substitute functions comprises a first set of functional aliases;
obtaining a modified mission critical service user profile to be used after a migration process,
wherein the modified mission critical service user profile comprises a second set of substitute functions,
wherein the second set of substitute functions comprises a second set of functional aliases, and
wherein the second set of functional aliases are different from the first set of functional aliases; and
activating the second set of substitute functions.

22. A method comprising:
requesting a mission critical service user profile,
wherein the mission critical service user profile comprises a first set of substitute functions, and
wherein the first set of substitute functions comprises a first set of functional aliases;
obtaining a modified mission critical service user profile to be used after a migration process,
wherein the modified mission critical service user profile comprises a second set of substitute functions,
wherein the second set of substitute functions comprises a second set of functional aliases, and
wherein the second set of functional aliases are different from the first set of functional aliases; and
activating the second set of substitute functions.

* * * * *